United States Patent [19]

Hideo

[11] Patent Number: 4,546,937
[45] Date of Patent: Oct. 15, 1985

[54] FISHING REEL

[75] Inventor: Noda Hideo, Sakai, Japan

[73] Assignee: Shimano Industrial Company Limited, Osaka, Japan

[21] Appl. No.: 464,885

[22] Filed: Feb. 8, 1983

[30] Foreign Application Priority Data

Feb. 25, 1982 [JP] Japan .............................. 57-26856[U]

[51] Int. Cl.[4] .............................................. A01K 89/00
[52] U.S. Cl. .................................................... 242/219
[58] Field of Search ................ 242/217, 219, 211–216, 242/218, 220, 221; 192/96, 99 R

[56] References Cited

U.S. PATENT DOCUMENTS

| 2,220,519 | 11/1940 | Grieten | 242/214 |
| 3,425,644 | 2/1969 | Griste | 242/213 |
| 3,478,979 | 11/1969 | Henze | 242/216 |
| 3,771,746 | 11/1973 | Griste | 242/219 X |

Primary Examiner—John M. Jillions
Attorney, Agent, or Firm—Stevens, Davis, Miller & Mosher

[57] ABSTRACT

A fishing reel provided with a drag mechanism and a drag lever for operating it, in which a mechanism for operating the drag lever in fine adjustment is incorporated, the fine adjustment operating mechanism comprising a rotary member and a contact member having the contact surface in contact with the rotary member, so that the rotary member rotates to enable a fine adjustment in the operation of the drag lever.

4 Claims, 5 Drawing Figures

FISHING REEL

FIELD OF THE INVENTION

This invention relates to a fishing reel, and more particularly to a fishing reel which supports a spool rotatably between a pair of side frames through a spool shaft so that a driving force from rotation of a handle is transmitted to the spool through a drag mechanism to thereby rotate the spool.

BACKGROUND OF THE INVENTION

Conventionally, a fishing reel has been proposed which is so constructed that a spool shaft is supported rotatably and axially movably between a pair of side frames and rotatably supports a spool, a drag mechanism comrising a drag disc, a drag washer and friction plates is interposed between one end of the spool shaft and the spool, a drag lever for axially moving the spool shaft is supported rotatably to one side frame, and the drag lever rotates to axially move the spool shaft and one of the spool and drag disc, the drag mechanism disengaging to allow the spool to freely rotate and engaging to apply a resistance to the free rotation of spool, thus transmitting a driving force from the spool shaft to the spool through the drag mechanism to wind a fishing line on the spool.

The drag lever, however, has no fine adjustment mechanism so fine adjustments can not be made. Hence, when the drag lever is excessively operated, the rotational resistance to the spool abruptly increases, thereby creating the problem that the spool is not freely rotatable even with the tension on a fishing line caused by a hooked fish, resulting in breakage of the line.

SUMMARY OF THE INVENTION

In the light of the above problem, this invention has been designed. An object of the invention is to provide a fishing reel which is simple in construction and has an easily and finely controlled drag lever.

The fishing reel of the invention comprises a spool shaft supported rotatably and axially movably between a pair a side frames, a spool supported rotatably to the spool shaft, a drag mechanism provided between the spool shaft and the spool, a drag lever for operating the spool shaft axially movably, and an operating mechanism for fine-adjusting the drag lever. The fine-adjustment operating mechanism comprises a rotary member having an operating member and supported to the drag lever and a contact member having a contact surface in contact with the rotary member and mounted to the one side frame, the rotary member rotating to enable a fine adjustment of the drag lever.

In other words, the drag lever, when operated directly and not through the rotation of the rotary member, tends to excessively operate as it can not perform a fine-adjustment, but, when controlled by the rotary member, it is rotatable at a slow speed, thereby being finely adjusted.

It is preferable that the rotary member comprises a gear toothed at the outer periphery and the contact member comprises a circular-arc-shaped rack and having at the outer periphery teeth engageable with those of the rotary member. Alternatively, the rotary member may use a roller having a friction surface. In this case, the contact member is circular-arc-shaped and has a friction surface at the outer periphery.

Other object and aspects of the invention will become apparent from the following description of an embodiment with reference to the accompanying drawings.

BRIEF DESCRIPTION OF THE DRAWINGS

FIG. 5 is a side view of a modified embodiment.

DETAILED DESCRIPTION OF THE INVENTION

Figure 1:
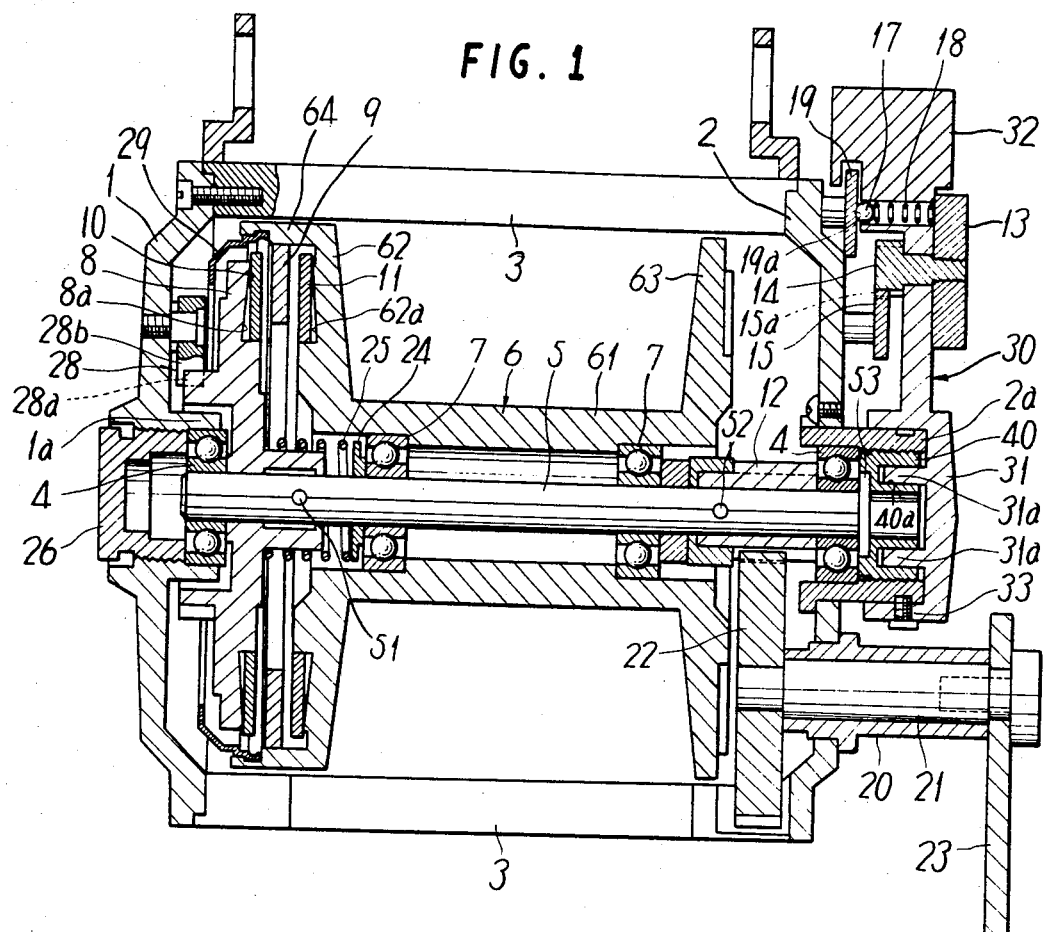
FIG. 1 is a longitudinal sectional view of an embodiment of a fishing reel of the invention.

Referring to the drawings, reference numerals 1 and 2 designate a pair of first and second side frames opposite to each other at a given interval. The side frames 1 and 2 comprise disc-like plate members and are connected at the outer peripheries by a plurality of connecting rods 3.

A spool shaft 5 is supported rotatably and axially movably between support cylinders 1a and 2a at the first and second side frames 1 and 2. At the axially intermediate portion of spool shaft 5 is supported a spool 6 comprising a cylindrical trunk 61 and a pair of first and second flanges 62 and 63 projecting radially from both lengthwise ends of trunk 61, the spool 6 being supported rotatably and not axially movably to the spool shaft 5 through a pair of bearings 7. A drag mechanism provided with a drag disc 8, a drag washer 9 and two contact plates 10 and 11, is provided between the spool shaft 5 and the spool 6 at a side of the first side frame 1. In detail, the drag disc 8 is supported to the spool shaft 5 in relation of being axially movable relative thereto, the contact plates 10 and 11 are supported to the drag disc 8 and first flange 62 respectively, and the drag washer 9 is interposed axially movably between the contact plates 10 and 11 and supported to a holding cylinder 64 at the first flange 62 of spool 6. A pinion 12 is supported to the axial end of spool shaft 5 at a side of the second side frame 2 in relation of being not axially movable relative to the spool shaft 5.

The second side frame 2 fixedly supports a tubular support 20. A handle shaft 21 is rotatably supported thereto and a master gear 22 engageable with the pinion 12 and constituting a drive mechanism for the spool shaft 5 is supported to the handle shaft 21 at its one end projecting inwardly of the second side frame 2. A handle 23 is fixed to the other end of handle shaft 21 projecting outwardly of second side frame 2, so that the handle 23 rotates to transmit a driving force therefrom to the spool shaft 5 through the pinion 12, the driving force being transmitted by engagement of the drag mechanism, to the spool 6 from the spool shaft 5 via the drag disc 8 and drag washer 9. A drag lever 30 for axially shifting the spool shaft 5 is supported rotatably to the support cylinder 2a at the second side frame 2. The drag lever 30 is rotated to shift the spool shaft 5 toward the first side frame 1 through a screw member 40, and the axial movement of spool shaft 5 is transmitted to the spool 6 through the bearing 4, pinion 12 and bearing 7, thereby allowing the drag washer 9 to press-contact with the drag disc 8 and applying a predetermined resistance against the free rotation of spool 6 by means of a dragging force caused by this press-contact.

The drag lever 30 comprises a boss 31 having a plurality of projections 31a projecting axially of the spool shaft 5 and a knob 32 projecting outwardly along the second side frame 2 from the boss 31, the boss 31 being supported rotatably onto the outer periphery of support cylinder 2a, the projections 31a being fitted into recesses 40a at the screw member 40 screwably inserted into the support cylinder 2a, so that the drag lever 30 is rotatably operated to screw the screw member 40 forwardly or backwardly.

The fishing reel of the invention constructed as foregoing, is provided with a fine-adjustment-operating mechanism for the drag lever 30. This mechanism comprises a rotary member 14 having an operating member 13 for rotatable operation and supported rotatably to the knob 32, and a contact member 15 which is half-cut-ring-like-shaped and has a contact surface 15a in contact with the rotary member 14 and is provided at the outer surface of second side frame 2, so that the operating member 13 is rotated to allow the rotary member 14 to roll with respect to the contact member 15, thereby rotating the drag lever 30 little by little.

The rotary member 14 preferably comprises a circumferentially toothed gear, which is disposed between the drag lever 30 and the second side frame 2, the operating member 13 being exposed outwardly from the drag lever 30 and operated from the exterior to roll the rotary member 14. The contact member 15 comprises a half-cut-ring-like-shaped rack having teeth engageable with those of rotary member 14 and is mounted on the outer surface of second side frame 2. Alternatively, the rotary member 14 may be formed of a non-toothed rotary member, such as shown in FIG. 5. In this case, the contact member 15 need not have teeth. Also, the rotary member 14 can be formed of metal or resin, but may alternatively be formed of a flexible material, such as rubber. The shape of contact member 15, when its contact surface is formed along the path of rotary member 14 rotatably moving during the turn of drag lever 30, is not particularly critical, and it may be integral with the second side frame 2.

The drag lever 30, after being operated at slow speed, is kept in position by means of contact resistance of rotary member 14 against the contact member 15. For this purpose, it is preferable to provide at the drag lever 30 a holding mechanism comprising a ball 17 and a spring 18 biasing it toward the second side frame 2. In this instance, it is preferable that a holding plate 19 having an arcuate groove 19a in contact with the ball 17 is mounted onto the outer surface of second side frame 2, thereby increasing the contact resistance.

In addition, the drag disc 8 is made axially movable relative to the first side frame 1, a spring 25 is interposed through a washer 24 between the drag disc 8 and the bearing 7 supporting the spool 6, the spring 25 biases the disc 8 and spool 6 away from the washer 9, and the support cylinder 1a at the first side frame 1 screwably supports an adjusting member 26, so that the adjusting member 26 is exposed at its rotary control portion and can be rotated from the exterior to axially move the disc 8, thereby adjusting an interval between the opposite surfaces of disc 8 and first flange 62.

Figure 3:
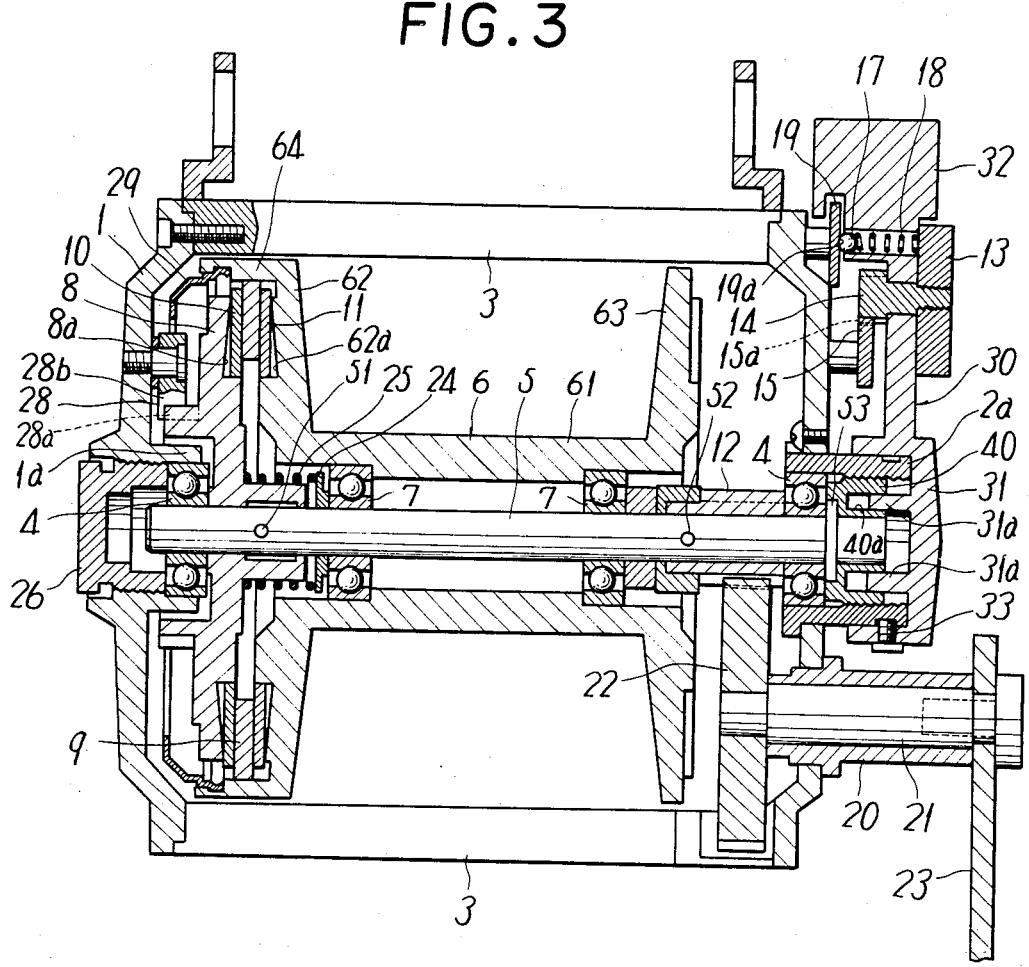
FIG. 3 is a longitudinal sectional view of the same, in which a spool shaft shifts axially.
Figure 4:
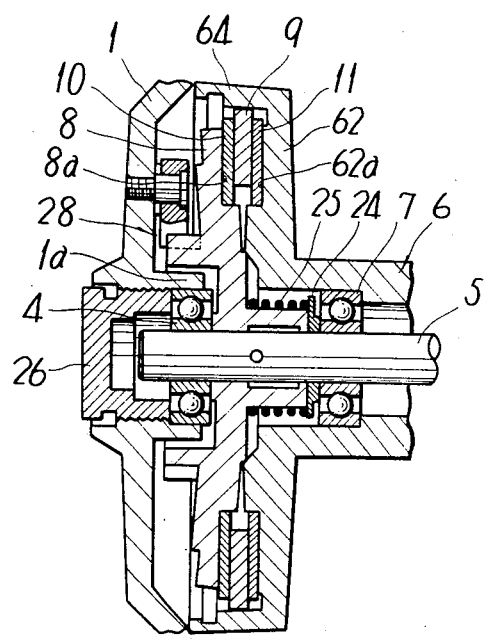
FIG. 4 is a view explanatory of the state where a contact plate comes into press-contact with a drag washer.

Also, the contact plates 10 and 11 are supported onto the opposite surfaces 8a and 62a of drag disc 8 and first flange 62, and deflect away therefrom when brought into press-contact intensively with the drag washer 9, thereby shifting with respect to the opposite surfaces 8a and 62a as shown in FIG. 3.

The spool shaft 5 comprises a straight shaft having no stepped portion at the outer periphery, and has at an intermediate portion transmitting pins 51 and 52 projecting radially outwardly from the shaft 5 and at the axial end a flange 53.

In the drawing, reference numeral 28 designates a sound generating mechanism comprising a ratchet 28a provided at the drag disc 8 and a sound generating pawl 28b pivoted to the first side frame 1 and a spring (not shown) biasing the pawl 28b toward the ratchet 28a, 29 designates an annular cover supported to the holding cylinder 64 for preventing rain water from entering a space between the drag disc 8 and the first flange 62, and 33 designates a set screw for the lever 30.

Figure 2:
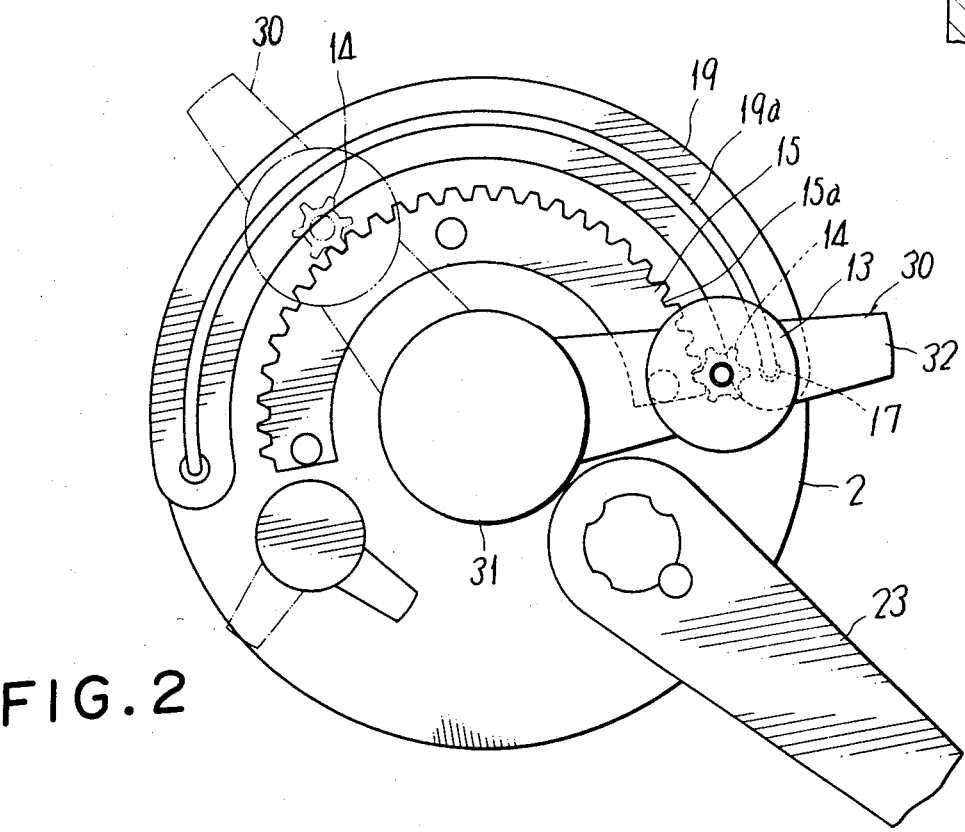
FIG. 2 is a side view of the FIG. 1 embodiment.

In the fishing reel of the invention constructed as foregoing, when a line is wound onto the spool 6 in the state of free rotation as shown in FIG. 1, the drag lever 30 is turned counterclockwise in FIG. 2 to allow the screw member 40 to screw forward to thereby shift by the thrust thereof the spool shaft 5 toward the first side frame 1, whereby the spool 6 carried on the spool shaft 5 moves toward the drag disc 8 against the spring 25, and the drag washer 9 moves toward the disc 8. Hence, the washer 9 is brought into press-contact with the contact plate 10, and the contact plate 11 held to the first flange 62 into press-contact with the washer 9, and the handle 23 is turned to transmit the driving force therefrom to the first flange 62 through the handle shaft 21, master gear 22, pinion 12, spool shaft 5, drag disc 8, contact plate 10, drag washer 9 and contact plate 11, thereby forcibly rotating the spool 6.

After the spool 6 is placed in the state of having given a resistance against its free the rotation by the drag lever 30 as abovementioned, the operating member 13 is rotated to allow the rotary member 14 to roll with respect to the contact member 15, thereby rotating the drag lever 30 at slow speed, thus enabling the fine adjustment of the rotational resistance to be imparted to the spool 6.

When the press-contact strength caused by movement of spool 6 is small, since the contact plates 10 and 11 are in contact with the drag washer 9 in a condition of being shiftable at the outer periphery edges as the supporting points with respect to the slant opposite surfaces 8a and 62a respectively, the free-rotational resistance caused by the presscontact is adjustable in a wide range.

On the other hand, the drag lever 30 is turned clockwise in FIG. 2 to screw the screw member 40 backward to thereby move the spool 6 away from the drag disc 8 and shift the shaft 5 toward the second side frame 2.

Alternatively, the drag lever 30 may be supported to the second side frame 2.

As seen from the above, the drag lever for axially moving a spool shaft supports the rotary member having an operating member, and one side frame is provided with a contact member having a contact surface contacting with the rotary member, so that the drag lever is operable in fine adjustment through the rotation of the rotary member, thereby facilitating fine adjustment of rotational resistance given to the spool. Accordingly, an abrupt increase of free-rotational resistance caused by excessive control of the drag lever is prevented to thereby avoid disconnection of the fishing line.

While a preferred embodiment of the invention has been described using specific terms, such description is for illustrative purpose only, and it is to be understood that changes and variations may be made without departing from the spirit or scope of the following claims.

What is claimed is :

1. A fishing reel comprising:
   a pair of side frames;
   a spool shaft supported rotatably and axially movably between said side frames;
   a spool supported rotatably and not axially movably with respect to said spool shaft;
   a drive mechanism for driving said spool shaft;
   a drag mechanism for applying a drag resistance against rotation of said spool,
   said drag mechanism engaging or disengaging by axial movement of said spool shaft, said drag mechanism engaging to transmit to said spool through a drag resistance rotation of said spool shaft produced by said drive mechanism and disengaging to allow said spool to freely rotate with respect to said spool shaft;
   a drag lever supported rotatably to one of said side frames for axially moving said spool shaft to control an amount of said drag resistance; and
   a fine adjustment mechanism for operating said drag lever to produce a fine adjustment in the amount of said drag resistance, said fine adjustment mechanism comprising a rotary member supported rotatably to said drag lever and having a rotary operating member, and a contact member which is fixed to said side frame supporting said drag lever and has a contact surface in contact with said rotary member, said rotary member being rotatably operable upon operation of said rotary operating member to finely change an angular position of said drag lever and enable a fine adjustment in said drag resistance.

2. A fishing reel according to claim 1, wherein said rotary member comprises a gear toothed circumferentially at the outer pheriphery thereof, said contact member comprising a rack which is circular-arc-shaped and has at the outer surface teeth engageable with those of said rotary member.

3. A fishing reel according to claim 1, wherein said rotary member comprises a roller having a friction surface, said contact member being circular-arc-shaped and having at the outer periphery a friction surface in engagement with the friction surface of said roller.

4. A fishing reel according to claim 1, wherein a holding mechanism for holding the fine adjustment position defined by said rotary member is provided between said drag lever and the side frame supporting said lever.

* * * * *